(12) United States Patent
Wolfe et al.

(10) Patent No.: US 9,178,694 B2
(45) Date of Patent: *Nov. 3, 2015

(54) SECURING BACKING STORAGE DATA PASSED THROUGH A NETWORK

(71) Applicant: EMPIRE TECHNOLOGY DEVELOPMENT LLC, Wilmington, DE (US)

(72) Inventors: Andrew Wolfe, Los Gatos, CA (US); Thomas Martin Conte, Atlanta, GA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/256,616

(22) Filed: Apr. 18, 2014

(65) Prior Publication Data

US 2015/0033036 A1    Jan. 29, 2015

Related U.S. Application Data

(63) Continuation of application No. 12/432,661, filed on Apr. 29, 2009, now Pat. No. 8,726,043.

(51) Int. Cl.
*G06F 9/00* (2006.01)
*H04L 9/00* (2006.01)
*H04L 9/06* (2006.01)

(52) U.S. Cl.
CPC ............... *H04L 9/00* (2013.01); *H04L 9/0631* (2013.01); *H04L 2209/08* (2013.01)

(58) Field of Classification Search
CPC ..... H04L 2209/08; H04L 9/00; H04L 9/0631; G06F 12/0866; G06F 12/1408
USPC ......... 713/193, 150, 165, 167, 189; 726/3, 15
See application file for complete search history.

(56) References Cited

U.S. PATENT DOCUMENTS 4,780,905 A    10/1988  Cruts et al.
5,224,166 A *   6/1993  Hartman, Jr. ................. 713/190
(Continued)

FOREIGN PATENT DOCUMENTS

KR          100676087        2/2007
KR       1020090019402 A     2/2009
(Continued)

OTHER PUBLICATIONS

International Preliminary Report on Patentability for PCT Application No. PCT/US2010/032817 dated Nov. 1, 2011.
(Continued)

*Primary Examiner* — Samson Lemma
(74) *Attorney, Agent, or Firm* — Dorsey & Whitney LLP

(57) ABSTRACT

Techniques described herein generally relate to methods, data processing devices and computer readable media to ensure that data stored in a remote backing storage device are in encrypted form before that data is transferred to another device or over a network. In some examples, the methods, data processing devices and computer readable media may be arranged to encrypt the data passed to the network when the data stored in the backing storage device is in unencrypted form. Also disclosed are methods, data processing devices and computer readable media that identify when the data stored in the backing storage device is in unencrypted form, including methods that may detect that the data may appear to be in encrypted form as a result of the data being compressed.

21 Claims, 8 Drawing Sheets

(56) References Cited

U.S. PATENT DOCUMENTS

| | | | |
|---|---|---|---|
| 5,386,471 A * | 1/1995 | Bianco | 713/162 |
| 6,249,866 B1 | 6/2001 | Brundrett et al. | |
| 6,832,314 B1 | 12/2004 | Irvin | |
| 6,896,669 B2 | 5/2005 | Krautkramer | |
| 6,948,033 B2 | 9/2005 | Ninose et al. | |
| 7,111,169 B2 | 9/2006 | Ripley et al. | |
| 7,181,572 B2 | 2/2007 | Walmsley | |
| 7,305,562 B1 | 12/2007 | Bianco et al. | |
| 7,337,328 B2 | 2/2008 | Evans | |
| 7,434,255 B2 * | 10/2008 | Akimoto | 726/13 |
| 7,613,920 B2 * | 11/2009 | Gustave et al. | 713/155 |
| 7,627,756 B2 * | 12/2009 | Fujibayashi et al. | 713/165 |
| 7,647,452 B1 | 1/2010 | Moll et al. | |
| 7,881,471 B2 | 2/2011 | Spohrer et al. | |
| 8,181,047 B2 | 5/2012 | Lee | |
| 8,213,607 B2 | 7/2012 | Rose et al. | |
| 8,341,724 B1 * | 12/2012 | Burns et al. | 726/13 |
| 8,352,679 B2 | 1/2013 | Wolfe et al. | |
| 2003/0005314 A1 | 1/2003 | Gammel et al. | |
| 2003/0028699 A1 | 2/2003 | Holtzman et al. | |
| 2003/0145329 A1 | 7/2003 | Candelore | |
| 2003/0177386 A1 | 9/2003 | Cuomo et al. | |
| 2004/0236884 A1 * | 11/2004 | Beetz | 710/68 |
| 2006/0080553 A1 | 4/2006 | Hall | |
| 2006/0129811 A1 | 6/2006 | Fiske | |
| 2006/0195704 A1 * | 8/2006 | Cochran et al. | 713/193 |
| 2006/0230234 A1 | 10/2006 | Bentolila et al. | |
| 2007/0038858 A1 | 2/2007 | Hughes | |
| 2007/0055893 A1 | 3/2007 | Dodd | |
| 2007/0101124 A1 * | 5/2007 | Pitts | 713/155 |
| 2007/0116267 A1 | 5/2007 | Speirs, II et al. | |
| 2007/0136606 A1 | 6/2007 | Mizuno | |
| 2007/0180239 A1 | 8/2007 | Fujibayashi et al. | |
| 2007/0245160 A1 | 10/2007 | Benhase et al. | |
| 2008/0017712 A1 * | 1/2008 | Hart et al. | 235/449 |
| 2008/0040710 A1 | 2/2008 | Chiriac | |
| 2008/0208755 A1 | 8/2008 | Malcolm | |
| 2008/0229118 A1 | 9/2008 | Kasako et al. | |
| 2008/0232592 A1 | 9/2008 | Lee et al. | |
| 2009/0006876 A1 * | 1/2009 | Fukatani et al. | 713/320 |
| 2009/0119242 A1 | 5/2009 | Vargas Martin | |
| 2009/0144546 A1 * | 6/2009 | Jancula et al. | 713/168 |
| 2010/0031062 A1 | 2/2010 | Nishihara et al. | |
| 2010/0042832 A1 | 2/2010 | Fujibayashi et al. | |
| 2010/0169683 A1 | 7/2010 | Wang et al. | |
| 2010/0281223 A1 | 11/2010 | Wolfe et al. | |
| 2010/0281247 A1 | 11/2010 | Wolfe et al. | |
| 2010/0287383 A1 | 11/2010 | Conte et al. | |
| 2010/0287385 A1 * | 11/2010 | Conte et al. | 713/193 |

FOREIGN PATENT DOCUMENTS

| | | | |
|---|---|---|---|
| WO | 2008/044837 A1 | 4/2008 | |
| WO | 2010/127008 A2 | 11/2010 | |
| WO | 2010/127030 A2 | 11/2010 | |

OTHER PUBLICATIONS

International Search Report and Written Opinion for PCT Application No. PCT/US2010/032817 dated Dec. 10, 2010.
International Search Report and Written Opinion for PCT Application No. PCT/US2010/032774 dated Dec. 20, 2010.
Shannon, "A Mathematical Theory of Communication", Bell System Technical Journal, vol. 27, Jul., Oct. 1948, pp. 379-423, pp. 623-656.

* cited by examiner

SECURING BACKING STORAGE DATA PASSED THROUGH A NETWORK

CROSS-REFERENCE TO RELATED APPLICATION

This application is a continuation under 35 U.S.C. §120 of U.S. patent application Ser. No. 12/432,661, filed on Apr. 29, 2009, issued as U.S. Pat. No. 8,726,043 on May 13, 2014, which is incorporated herein by reference in its entirety and for any purpose.

BACKGROUND

Data stored and transmitted electronically is vulnerable to theft. Data storage devices, such as hard drives, flash drives, compact disks, memory chips and the like, whether portable or built into a computing device, are vulnerable to unauthorized remote access or the data being intercepted in transmission (i.e., "hacking") if linked to a network. Data storage devices are also vulnerable to theft of the physical device.

One widely used technique for preventing data theft is to store data in an encrypted format unreadable by unauthorized users. Such methods usually involve transforming the data with some sort of encryption algorithm. To read the encrypted data, a decryption key or algorithm must be used. Access to the decryption key or algorithm is typically limited to authorized users. Without the decryption key, unauthorized users generally are limited to "brute force" decryption techniques to decrypt the data.

Caching is a nearly ubiquitous technique used with modern data processing devices to improve overall performance. Data access from backing storage devices is relatively slow compared to the data processing speed of the central processing unit (CPU) of modern computing devices. The CPU can be left operating at less than full capacity, remaining idle for several chip cycles as it waits for data to be read from storage, causing overall computer performance to suffer. A solution to this is a cache, in which frequently retrieved data from backing storage devices is copied by the CPU and stored in main memory (i.e., in random access memory (RAM)). More generally, data stored on a server or external disk array can be cached in local RAM, on non-volatile solid state memory, or on local disk drives. Data is accessed by the CPU much more quickly from these local caches than from even the fastest network storage devices. Quicker access to frequently used data thus greatly improves overall processing speeds.

BRIEF DESCRIPTION OF THE FIGURES

The foregoing and other features will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
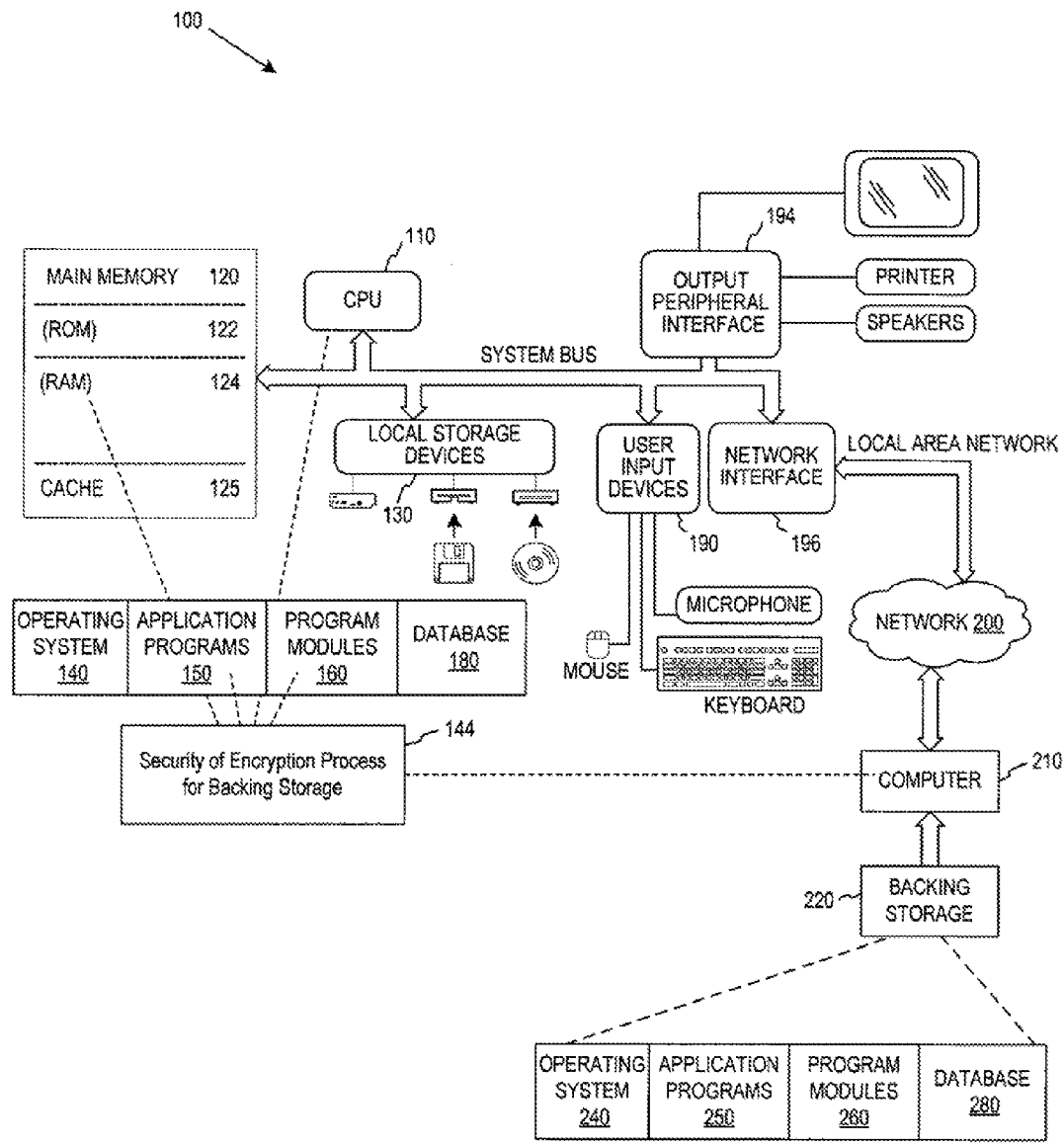
FIG. 1 is a block diagram of an example of a computer system for use with methods of securing remote backing storage data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly and implicitly contemplated and made part of this disclosure.

Described herein, inter alia, are methods, apparatus, computer programs and systems related to securing data. Examples provided herein thus may be used for providing security against reading of data in a cache by unauthorized users. In various examples, the method may run continually. Continually may include running at regular intervals, or when predetermined processes occur. In various examples, hardware and software systems and methods are disclosed. There are various vehicles by which processes and/or systems and/or other technologies described herein can be effected (e.g., hardware, software, and/or firmware), and that the vehicle used in any given embodiment may vary within the context in which the processes and/or systems and/or other technologies are deployed.

Accordingly, systems and methods for securing data and/or erasing secure caches are generally described. Data added to the cache may be encrypted, or re-encrypted in the case of decrypted data, as it is recognized as unencrypted data by an encryption method as disclosed herein, such as a native encryption routine. Various examples contemplated herein encrypt data in the cache when the data has been analyzed and a decision to encrypt has been made. Such analysis may comprise determining whether the data was previously encrypted and thus is already in an encrypted state. Data in the cache may be decrypted for data processing by an algorithm using a decryption key. Data stored in backing storage may also be stored in encrypted form. To further strengthen security, the backing storage data can be transmitted from a remote computer network to a computer containing the cache in encrypted form so that it is protected from theft while enroute. If the data are stored in the backing storage in encrypted form, the data may be sent without further encryption. If the backing storage data are unencrypted, the data may be encrypted before being sent. In such case, a controller, computer or other device near or at the backing storage may be arranged to selectively encrypt the data before the data are sent to the computer containing the cache. In some examples, the data may be sent from the backing storage to the cache in encrypted form only if certain conditions are met. For example, the data can be encrypted if the data are stored in encrypted form in the backing storage or there is some other indication that the data should be encrypted before being sent. In some examples, a table may be queried to determine whether the data are to be encrypted, or entropy analysis may be performed on the backing storage data to determine if the data stored in the backing storage device may be in encrypted form. In some examples, it is first determined or estimated whether or not the backing storage data is encrypted or unencrypted. This can be done by testing for records in the file or file system that indicate encryption; by measuring characteristics of the file such as entropy; by relying on the file type or file name; or any other known method for doing so. Encrypted files are then transmitted to the file cache without further encryption. Unencrypted or indeterminate files are encrypted by the controller, computer or other device near or at the backing store for transmission to the cache.

The native encryption routine may further be used to encrypt data only when a particular condition indicative of user authentication or data security has occurred. Additionally, data encryption may be terminated and encrypted data stored in a cache may be erased (or purged) when a particular condition that may compromise the security of the data has occurred. For example, encrypted data stored in the cache may be erased when security credentials are determined to be compromised, such as, for example, when a computer has lost contact with a network (an indication that a data processor may have been stolen) or an authorized user is no longer using the computer. Also, data encryption may be conditioned on identifying an authorized user by an identification process, such as radio frequency identification (RFID) cards, a biometric security device such as a thumbprint scan, a password entry, a smartcard reader, etc. Encrypted data stored in the cache may then be erased if authentication is lost, such as when a user authentication RFID card may no longer be read, the computer may leave a particular network domain, a network connection may be lost, files stored in cache may not have been recently updated, etc. Encrypted data stored in the cache may also be erased if periodic reauthentication does not occur.

Accordingly, FIG. 1 is a block diagram of an example of a computer system for use with methods of encrypting backing storage data in accordance with at least some examples of the present disclosure.

The example computer system includes a computer 100 containing a CPU 110, a main memory 120 and one or more local storage devices 130. The processor 110 may generally be of any desired configuration including but not limited to a microprocessor (µP), a microcontroller (µC), a digital signal processor (DSP), any combination thereof, or some other device. The CPU 110 may include logic for executing program instructions as well as other functional blocks such as an arithmetic logic unit (ALU), a floating point unit (FPU), a digital signal processing (DSP) core, registers, accumulators, etc.

The main memory 120 may be any suitable form of memory including, but not limited to, volatile memory such as random access memory (RAM) 124, non-volatile memory such as read only memory (ROM) 122 and flash memory, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile. The main memory 120 may contain in RAM 124, a cache 125, in which frequently accessed data from the local storage devices 130 may be stored during computer operation. The local storage devices 130 and its associated computer storage media, may provide storage of computer readable instructions, data structures, program modules and other data for the computer 100. The local storage devices 130 may store one or more of an operating system 140, application programs 150, program modules 160, and/or a database 180. Although the example of the computer system shown in FIG. 1 uses the RAM as a cache 125 in which frequently accessed data from the local storage devices 130 may be accessed during computer operation, in other embodiments the local storage devices 130 may be used to cache data received from external sources, such as a network, as explained in greater detail below.

In some examples, a security or encryption process 144 may be loaded into main memory (RAM) 124 by software, or by other means such as a flash memory chip, from one of the applications programs 150 or it may be one of the program modules 160. Once loaded in the main memory 120, the process 144 may be operated on by the CPU 110 encrypt and/or decrypt data that may be stored in the cache 125. The data stored in the cache 125 in encrypted form may be data transferred from the local storage devices 130 or from some other device. The process 144 may, in some examples, run continuously as a background process while the CPU 110 may be running and restart automatically after a CPU sleep/hibernation event or after a restart or when the data processing device may next be turned on. Alternatively, an authorized user, such as a user with administration privileges (that is, authorized to change security settings), may turn off (or deactivate) or turn on (or activate) the process 144 as needed. Further, the process 144 may be designed to run periodically. In other examples, the data stored in the cache 125 may be erased upon certain conditions, such as the computer 100 entering a sleep or hibernate mode, the computer becoming disconnected from a network, if periodic re-authentication does not occur, or other event or situation is detected.

The computer 100 may further include user input devices 190 through which a user may enter commands and data. Example input devices may include an electronic digitizer, a microphone, a keyboard and pointing device, such as a mouse, trackball touch pad or other device. Other example input devices may include a joystick, game pad, satellite dish, scanner, or the like. These and other input devices may be coupled to the CPU 110 through a user input interface that may be coupled to a system bus, or may be coupled by other interface and bus structures such as a parallel port, game port or a universal serial bus (USB). Computers such as computer 100 may also include other peripheral output devices such as speakers, which may be coupled through an output peripheral interface 194 or the like.

The computer 100 may be coupled to a network 200 using logical connections to one or more computers, such as a remote computer 210, coupled to a network interface 196. The remote computer 210 may be a personal computer (PC), a server, a router, a network PC, a peer device or other common network node. The remote computer 210 may include a backing storage device 220 that may store readable instructions, data structures, program modules and/or other data for use by the computer 100 and other computers (not shown) connected to the network. As shown in FIG. 1, the security or encryption process for backing storage 144 may cause the computer 210 to store in backing storage device 220 all or some of an operating system 240, application programs 250, program modules 260, and/or a database 280.

Networking environments are commonplace in offices, enterprise-wide area networks (WAN), local area networks (LAN), intranets and world-wide networks such as the Internet. For example, the remote computer 210 and/or backing storage device 220 coupled to the remote computer may comprise source data of data for storage in the data cache 125. The backing storage device 220 may be any electronic device that is capable of storing data, such as a server, a hard disk drive ("HDD"), a compact disk ("CD") drive, a digital video disk ("DVD") drive, flash memory, or another computer system, to name a few. Source and destination machines need not be coupled through the network 200 or any other means, but instead, data may be migrated via any media capable of being written by the source platform and read by the destination platform or platforms. When used in a LAN or WAN networking environment, the computer 100 may be coupled to the LAN through a network interface 196 or an adapter. When used in a WAN networking environment, the computer 100 may include a modem or other means for establishing communications over the WAN, such as the Internet. It will be appreciated that other means of establishing a communications link between the computers 100, 210 may be used.

The backing storage device 220 may be arranged to store data in encrypted form or in unencrypted form. In other examples, some of the data stored in the backing storage 220 may be encrypted and other data may be unencrypted. The computer 210 may be arranged to encrypt data stored in the backing storage device 220 before the data are sent to the network 200. If the data are stored in the backing storage 220 is in encrypted form, the computer 210 may be arranged to send the data to the network 200 without further encryption. In other examples, the computer 210 may be arranged to encrypt the data only if certain conditions are met. For example, the computer 210 may be arranged to encrypt the data when the data stored in the backing storage device 220 is determined to be in encrypted form, or when there is some other indication that the data should be encrypted before being sent through the network 200. In some examples, a table may be queried to determine whether the data are to be encrypted, or entropy analysis may be performed on the backing storage data to determine if the stored data may be in encrypted form. Once the computer 210 makes a determination to encrypt data, any suitable method for encrypting the data may be used. The actual native encryption routine used to encrypt the data in the cache may be the AES. Further, data that has already been encrypted may be readily recognized so that it is not encrypted a second time.

Figure 2:
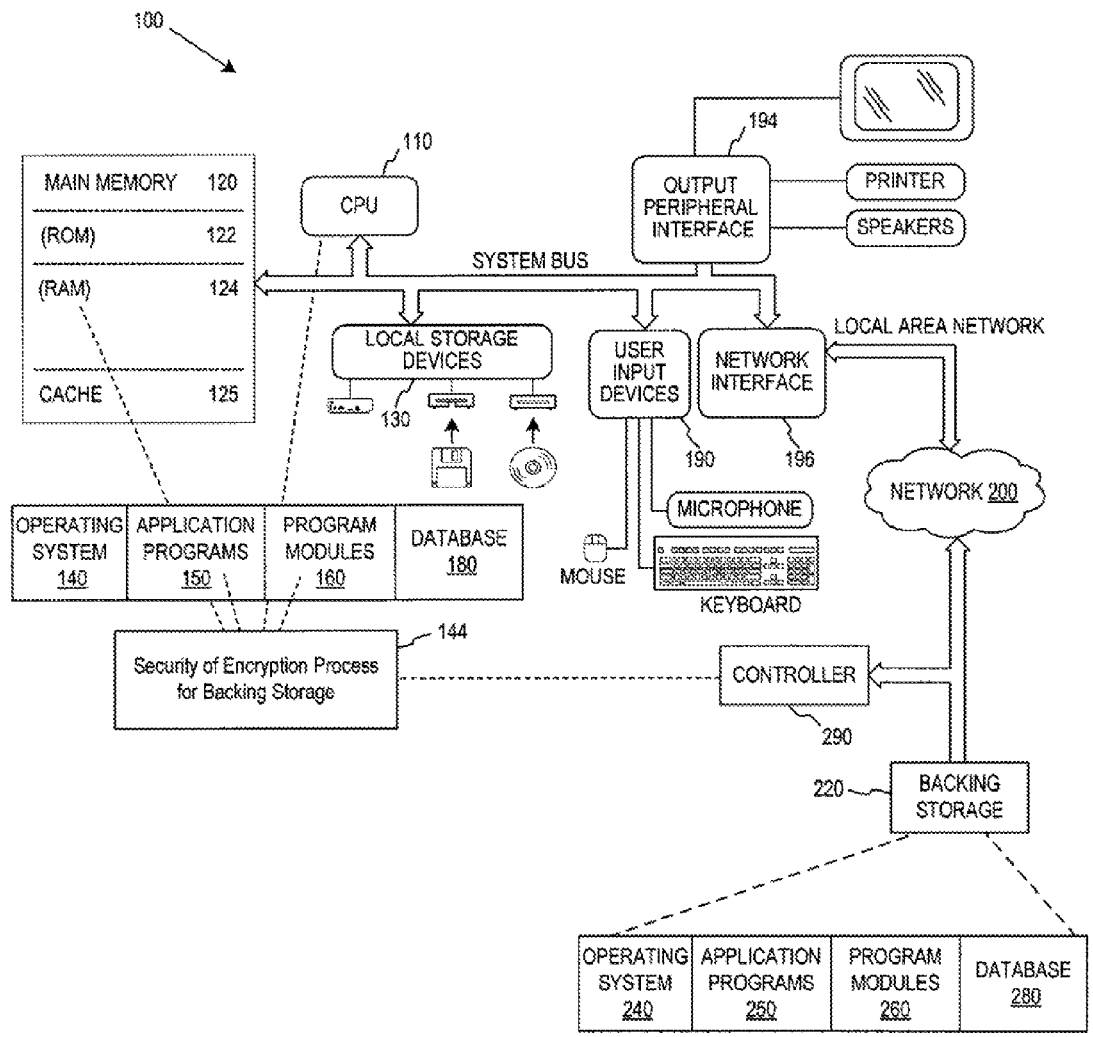
FIG. 2 is a block diagram of another example of a computer system for use with methods of securing remote backing storage data.

FIG. 2 is a block diagram of another example of a computer system for use with methods of securing remote backing storage data, arranged in accordance with at least some examples of the present disclosure. The example shown in FIG. 2 is substantially the same as the example shown in FIG. 1. Therefore, in the interest of clarity and brevity, identical reference numerals have been used for identical components, and an explanation of their function and operation will not be repeated. The computer system example of FIG. 2 differs from the example of FIG. 1 in that the network interface 196 of the computer system 100 is coupled through the network 200 to the backing storage device 220 rather than to a computer 210 (FIG. 1). However, a controller 290 may also be coupled to the network 200 and the backing storage device 220. The controller 290 may be any presently existing or hereinafter developed device that performs all or some of the functions described above for the computer 210.

Figure 3:
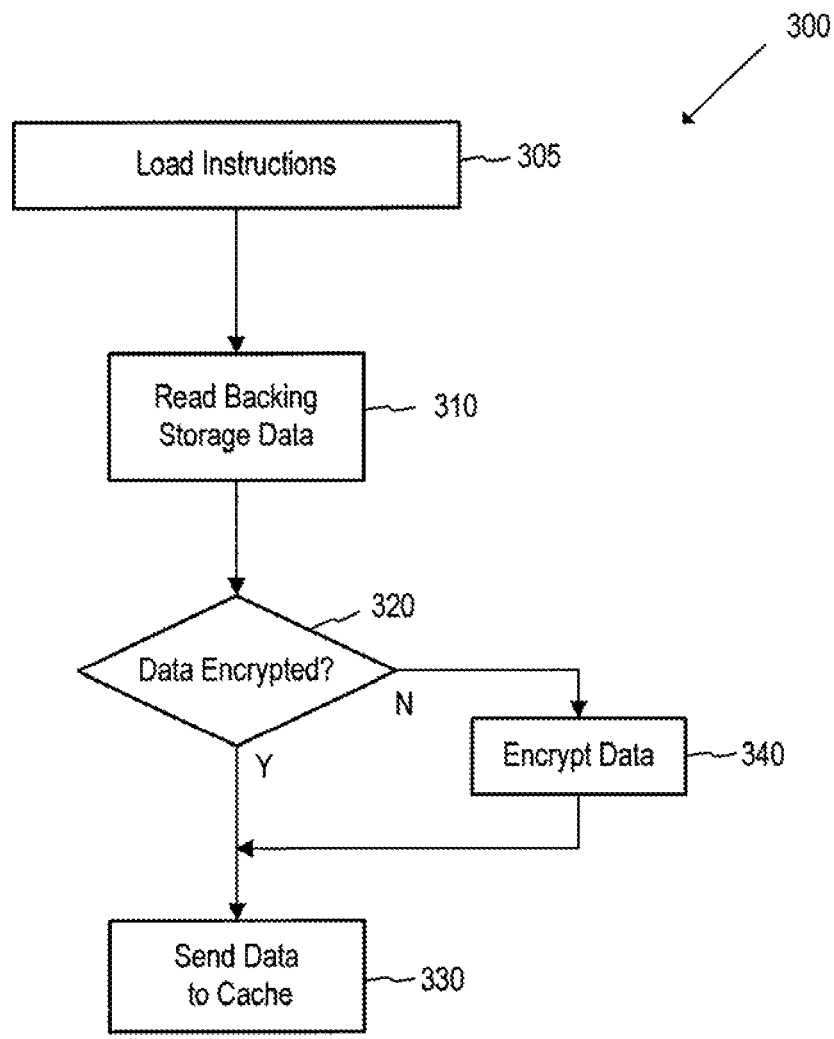
FIG. 3 is a flowchart showing an example of a process for encrypting backing storage data before passing the backing storage data to a network.

FIG. 3 is a flowchart showing an example of a process 300 for encrypting data before passing the backing storage data, arranged in accordance with at least some examples of the present disclosures, to the network 200. The process 300 may include one or more operations or functions as illustrated by blocks 305-330. In some examples, the process 300 may begin when instructions are loaded into a data processor in the computer 210 or controller 290 (block 305). Data stored in the backing storage device 220 may then be read from the backing storage device 220 (block 310). The computer 210 or controller 290 may then make a determination as to whether the data read from the backing storage device 220 is encrypted (block 320). If so, the computer 210 or controller 290 may send the data to the cache 125 through the network 200 in the encrypted form in which the data are read from the backing storage device 220 (block 330). If the data read from the backing storage device 220 is unencrypted, the data may be encrypted (block 340) before being sent (block 330) to local storage in the computer 100. In the examples of computer systems 100 shown in FIGS. 1 and 2, the portion of the main memory 120 is used as the cache 125 for storing data received from the backing storage device 220. However, in other embodiments, the local storage device 130 may be used to store data received from the backing storage device 220. Although the CPU 110 may not be able to access data from the main memory, it may nevertheless be quicker to access data from the local storage device 130 than it would be to access data from the backing storage device 220. Thus, the local storage device 130 or other devices in the computer 100 may also be used as the cache.

Figure 4:
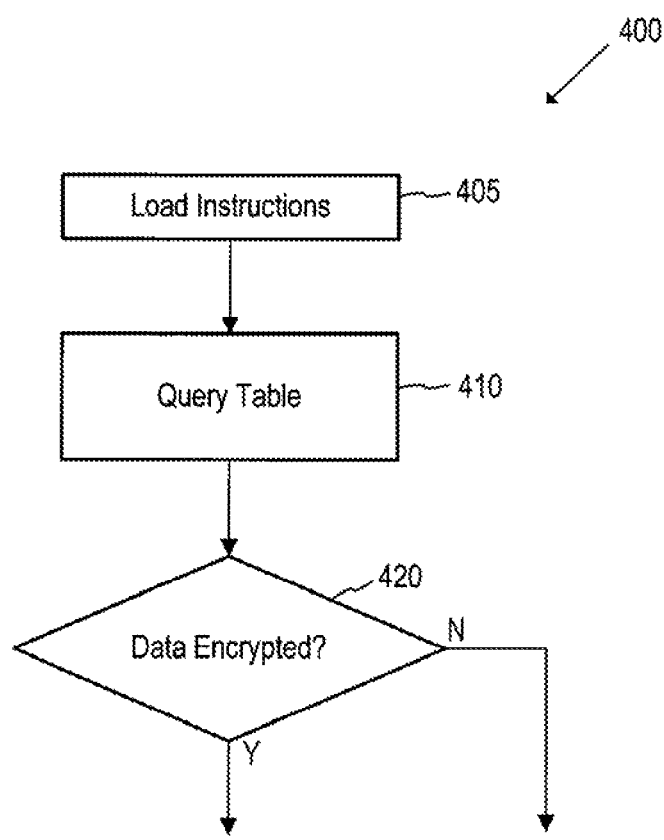
FIG. 4 is a flowchart showing an example of the process for making a determination as to whether data read from a backing storage device are encrypted in the process of FIG. 3.

FIG. 4 is a flowchart showing an example of a process 400 for making a determination as to whether data read from a backing storage device are encrypted in the process of FIG. 3, arranged in accordance with at least some examples of the present disclosure. The process 400 may include one or more operations or functions are illustrated by blocks 405-420.

In some examples, the process 400 may begin when instructions are loaded into a data processor in the computer 210 or controller 290 (block 405). A table identifying which files are encrypted may then be queried (block 410). The table may be generated, for example, by conventional means when the data in the backing storage is originally encrypted, or it may be generated in some other manner. A determination may then be made (block 420) on the basis of the data in the table about whether the backing data are encrypted.

Figure 5:
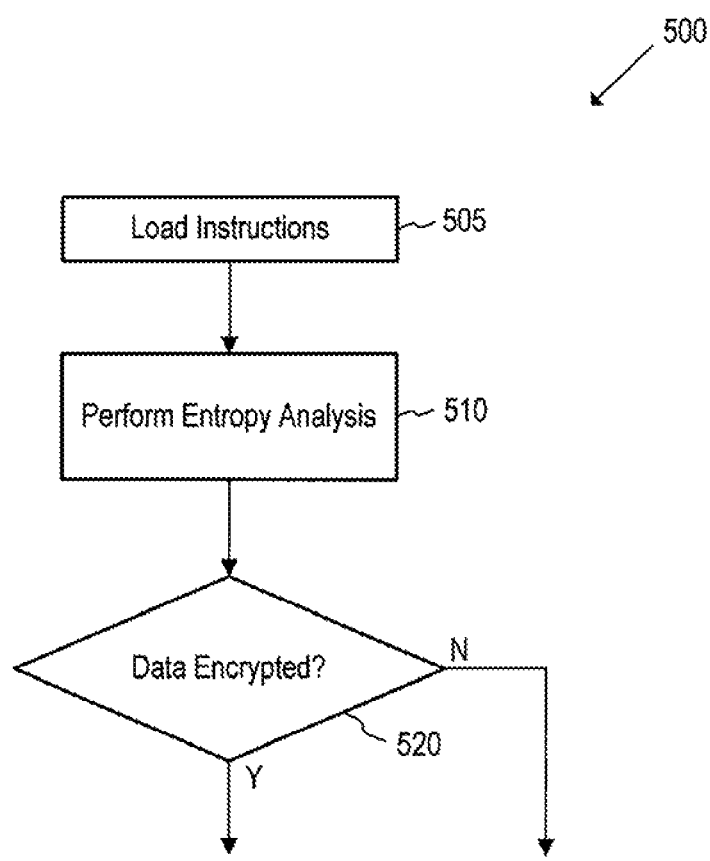
FIG. 5 is a flowchart showing another example of the process for making a determination as to whether data read from a backing storage device are encrypted in the process of FIG. 3.

FIG. 5 is a flowchart showing another example of a process 500 for making a determination as to whether data read from a backing storage device are encrypted in the process of FIG. 3, arranged in accordance with at least some examples of the present disclosure. The process 500 may include one or more operations or functions are illustrated by blocks 505-520.

In some examples, the process 500 may begin when instructions are loaded into a data processor in the computer 210 or controller 290 (block 505). Entropy analysis may then be performed on the backing storage data (block 510) to determine if the data may be stored in encrypted form. The entropy analysts may, for example, examine the degree to which the read backing data may be random. This examination may, for example, be made on a byte-by-byte basis. If the read backing data has/have a certain degree of randomness, then they may be more likely to be encrypted. Otherwise, the read backing data may likely be unencrypted. In either case, once the entropy analysis has been made, a determination may be made (block 520) on the basis of the entropy analysis about whether the backing data may be encrypted.

Figure 6:
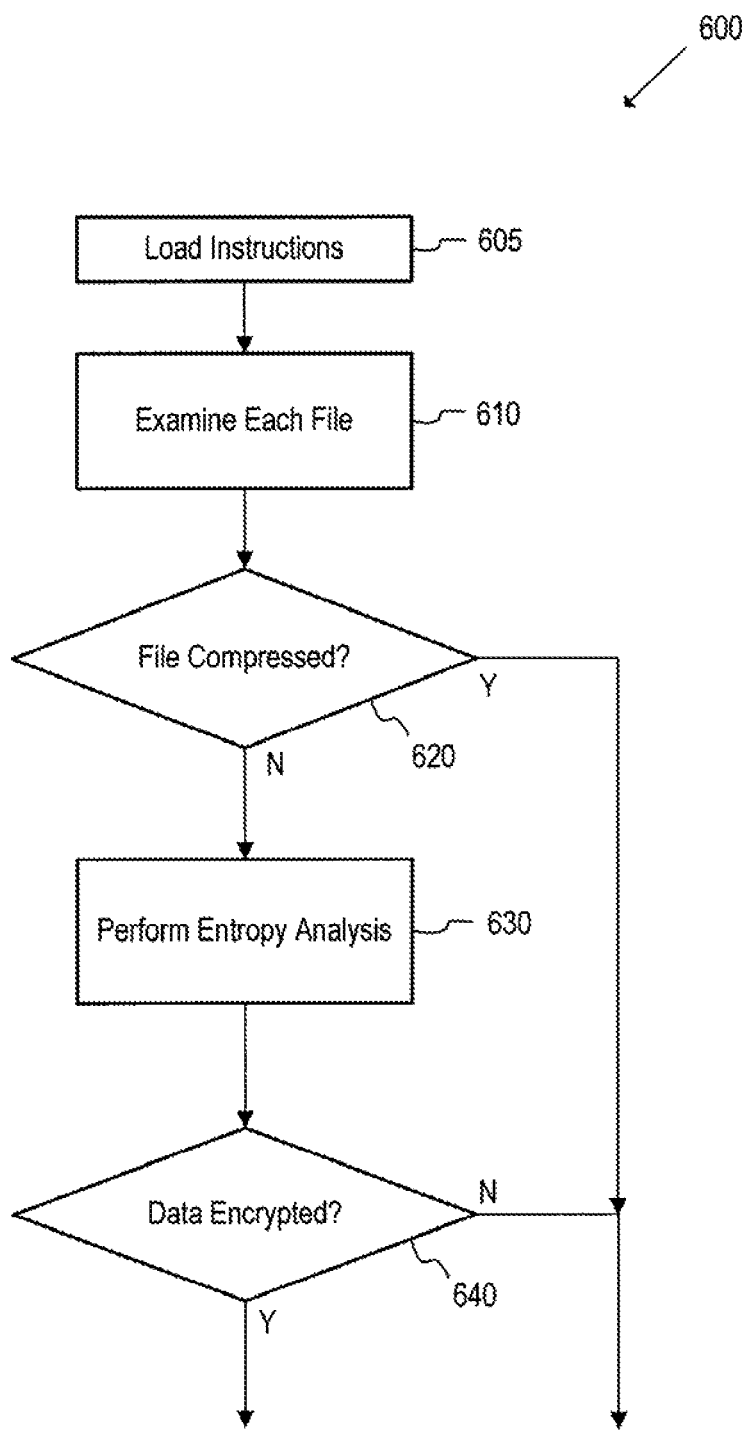
FIG. 6 is a flowchart showing still another example of the process for making a determination as to whether data read from a backing storage device are encrypted in the process of FIG. 3.

FIG. 6 is a flowchart showing still another example of a process 600 for making the determination as to whether the data read from a backing storage device are encrypted in the process of FIG. 3, arranged in accordance with at least some examples of the present disclosure. The process 600 may include one or more operations or functions are illustrated by blocks 605-640. The process 600 is similar to the process 500 shown in FIG. 5 except that it compensates for a certain randomness that unencrypted backing storage data may have begins when the unencrypted data have been compressed.

In some examples, process 600 may begin when instructions may be loaded into a data processor in the computer 210 or controller 290 (block 605). Each file of read backing storage data may then be examined (block 610) to determine if the file may have a header indicating that the file is compressed. Based on the examination, a determination may be made (block 620) about whether the file may be compressed. If so, entropy analysis may not be performed since a degree of randomness in the file may be attributed to the file being compressed. Thus, the data may be considered to be unencrypted. If it is determined at block 620 that the file is not compressed, then entropy analysis may be performed on the file (block 630) to determine if the data may be stored in encrypted form. Again, this examination may be made on a byte-by-byte basis. A determination may then be made (block 640) on the basis of the analysis about whether the backing data are encrypted.

Figure 7:
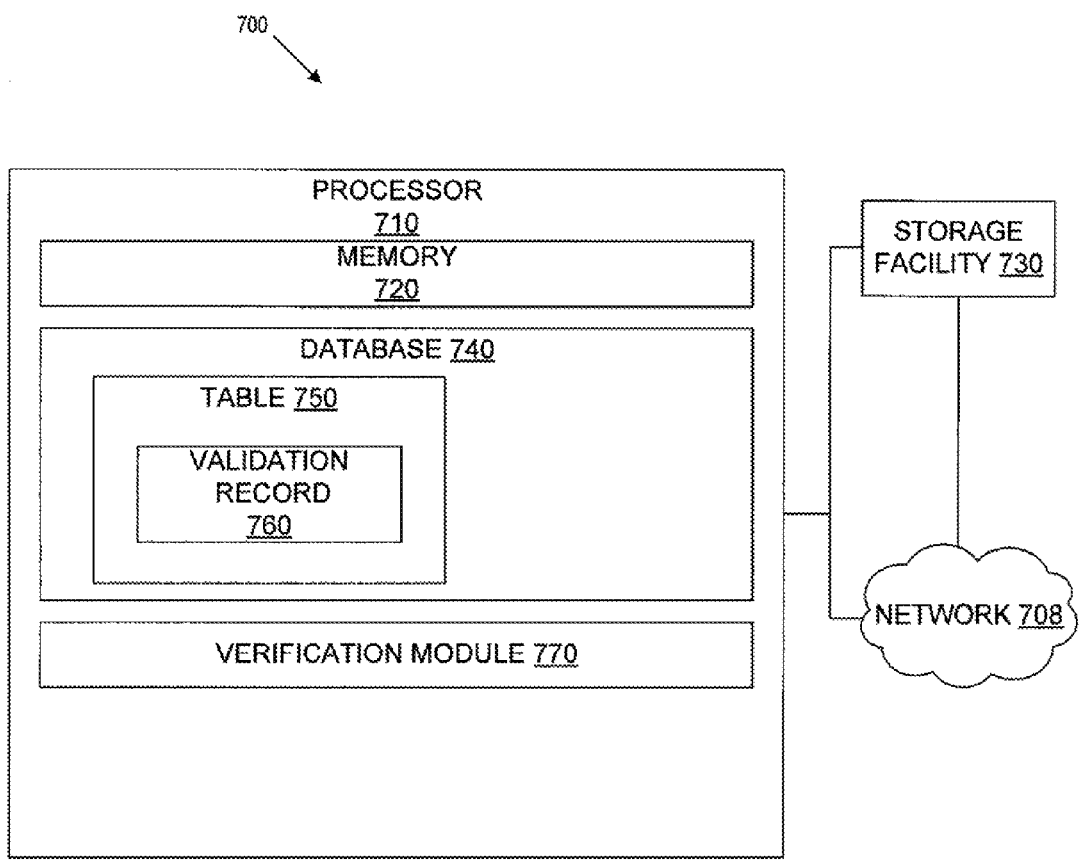
FIG. 7 is a block diagram of a special purpose computer system including a processor configured to secure data passed to a network from a remote backing storage device.

FIG. 7 is a block diagram of a special purpose computer system 700 including a processor configured to secure data passed to a network from a remote backing storage device, arranged in accordance with at least some examples of the present disclosure. In this particular example, the special purpose computer system 700 may be used as the controller 290, and it may include a processor 710 configured for performing an embodiment of a method for selectively securing data before the data are passed to the network 200. In other embodiments, various operations/functions or portions of various operations/functions of the described methods may be performed outside of the processor 710. The special purpose computer system 700 may include a system memory 720, which may be RAM, ROM, flash memory, or some other type of memory as previously described. The special purpose computer system 700 may also include a database 740, which may be any means for storing data including a disk drive, ROM, and/or flash memory, to name a few. The database 740 may constitute the backing storage 220 described above where the data to be cached may be stored. The database 740 may include a table 750 that may identify whether the data stored in the database 740 may have been encrypted before being stored. The special purpose computer system 700 may also includes a verification module 770 that may be arranged to inhibit sending data to the network 200 until validation credentials are received that match authentication data stored in a validation record 760. The verification module 770 may be arranged to communicate with the processor 710 to perform one or more of the operations/functions previously described. The special purpose computer system 700 may be coupled to a network 708, such as the network 200, and may, in turn, be coupled to an external storage facility 730. The external storage facility 730 may also, or alternatively, constitute the backing storage described above where the data to be cached may be stored.

Figure 8:
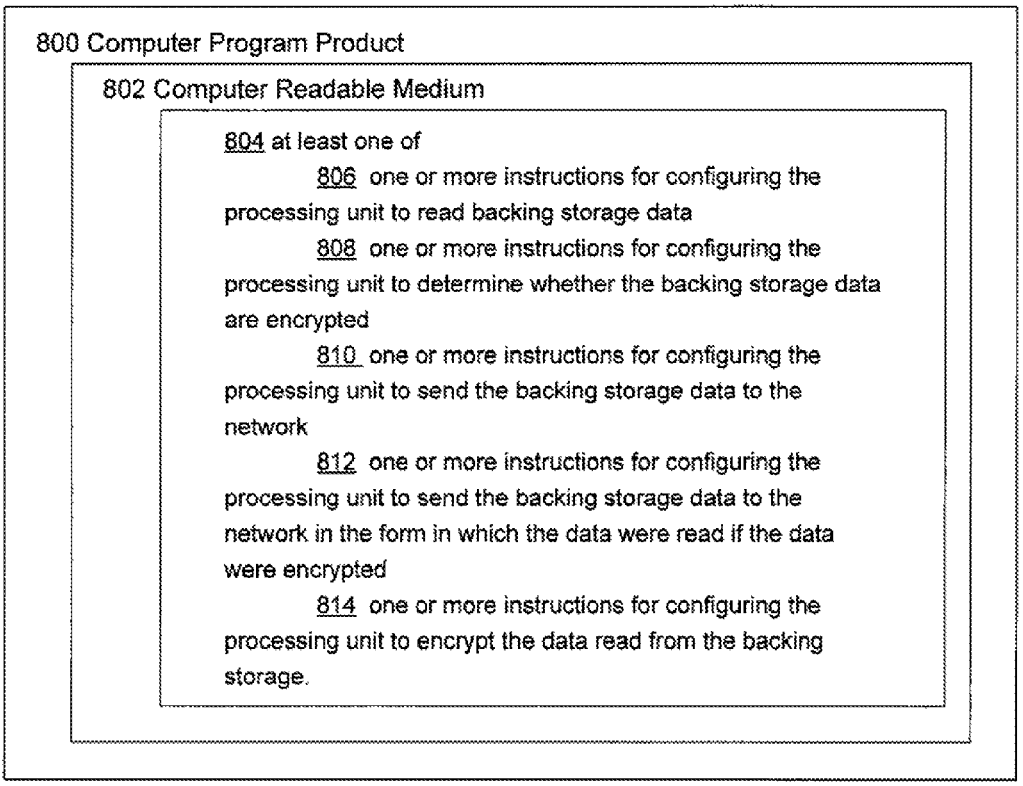
FIG. 8 shows an example of any computer readable medium that stores instructions to configure a processing unit to secure data passed to a network from a remote backing storage device, all arranged in accordance with at least some examples of the present disclosure.

FIG. 8 shows an example of any computer readable medium 802 that stores instructions to configure a processing unit to secure data passed to a network from a remote backing storage device, all arranged in accordance with at least some examples of the present disclosure. The computer readable medium 802 that may be part of a computer program product 800. The computer readable medium 802 stores instructions 804 that may be arranged to configure the processing unit to perform one or more of the processes or methods previously described. These instructions 804 may include, for example, one or more executable instructions 806 to configure the processing unit to read data stored in the backing storage device 220. The executable instructions 804 stored in the computer readable medium 802 may also include an executable instruction 808 to configure the processing unit to determine whether the data read from the backing storage device 220 may be encrypted. Another executable instruction 810 stored in the computer readable medium 802 may be arranged to configure the processing unit to send the data to the network in the form in which the data may be read from the backing storage device when the data may already be encrypted. On the other hand, when the data may not already be encrypted, an executable instruction 814 may be stored in the computer readable medium 802 that may configure the processing unit to encrypt the data read from the backing storage before the instruction 810 configures the processing unit to send the data to the network.

The foregoing describes various examples of securing data read from backing storage before the data are passed to a network for receipt by a computer system having a local storage cache. Specific examples of methods and systems of data encryption described are for illustration only and are not intended to be limiting. The described data encryption system and method generally relate to encrypting data read from a backing storage device before the backing storage data are passed to a computer network for transmission to a computer containing a data cache. If the data are stored in the backing storage in encrypted form, the data can be sent without further encryption. In some examples, the data are sent from the backing storage to the cache in encrypted form only if certain conditions are met, such as where there is some indication from the data itself that the data should be encrypted before being sent. In some examples, a table may be queried to determine whether the data are to be encrypted, or entropy analysis can be performed on the backing storage data to determine if the data were stored in encrypted form.

Examples are also provided of computer-accessible mediums having stored thereon computer-executable instructions for encrypting backing storage data before being passed to a network when the executable instructions are executed by a processing unit. The described instructions may configure the processing unit to encrypt the backing storage data only when a particular condition has occurred.

The present description is not to be limited in terms of the particular examples described in this application, which are intended as illustrations of various aspects. Many modifications and examples can/may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least;" "greater than;" "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following; a recordable type medium such as a floppy disk, a hard disk drive, a Compact Disc (CD), a Digital Video Disk (DVD), a digital tape, a computer memory, etc.; and a transmission type medium such, as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Use herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to secure data read from a storage device before the data is passed to a network, comprising:
    reading data from the storage device before the data is passed to the network;
    examining, with an electronic device, the data read from the storage device to identify header information that indicates whether the data is either compressed or uncompressed;
    identifying the data as either compressed or uncompressed based on the examination of the header information;
    evaluating the data to determine whether the data read from the storage device is in encrypted form or whether the data read from the storage device is in unencrypted form;
    passing the data read from the storage device without further encryption in response to determination that the data read from the storage device is in encrypted form so as to avoid double encryption of the data;
    encrypting the data read from the storage device in response to determination that the data read from the storage device is not in encrypted form;
    passing the encrypted data to the network; and
    storing the encrypted data in a cache.

2. The method of claim 1, further comprising encrypting the data read from the storage device for the data that is identified as compressed before the data read from the storage device is passed to the network.

3. The method of claim 1, wherein evaluating the data read from the storage device to determine whether the data is in encrypted form comprises examining a table associated with the data read from the storage device.

4. The method of claim 1, wherein evaluating the data read from the storage device to determine whether the data is in encrypted form comprises evaluating records in a file or a file system that indicate encryption.

5. The method of claim 1, further comprising:
    receiving security credentials;
    erasing the data in the cache if the security credentials are determined to be compromised.

6. The method of claim 5, wherein the security credentials are determined to be compromised in response to loss of contact by the cache with the network.

7. The method of claim 1, wherein encrypting the data includes using an advanced encryption standard (AES) routine.

8. A remote data storage system that includes data security, the remote data storage system comprising:
    a storage device configured to store data in encrypted form unencrypted form, or combinations thereof; and
    an electronic device coupled to the storage device, the electronic device configured to examine data read from the storage device before the data is passed to a network, the electronic device further configured to identify the data read from the storage device as either stored in encrypted form or stored in unencrypted form,
    wherein the electronic device is further configured to encrypt the data read from the storage device before the data read from the storage device is output from the remote data storage system to the network, in response to the data read from the storage device being identified as stored in unencrypted form and in response to identification of an authorized user by an input device coupled to the electronic device, and
    wherein the electronic device is further configured to examine the data read from the storage device to identify header information that indicates whether the data read from the storage device is either compressed or uncompressed and further configured to identify the data read from the storage device as either compressed or uncompressed based on the examination of the header information.

9. The remote data storage system of claim 8, wherein the input device is configured to receive information from a radio frequency identification card.

10. The remote data storage system of claim 8, wherein the input device is configured to receive biometric information.

11. The remote data storage system of claim 8, further comprising a cache coupled to the electronic device through the network, wherein the cache is configured to receive the data stored in encrypted form from the electronic device.

12. The remote data storage system of claim 11, wherein the electronic device is further configured to erase the encrypted data from the cache if the authorized user is not identified by the input device.

13. The remote data storage system of claim 11, wherein the electronic device is further configured to erase the encrypted data from the cache in response to entry of the remote data storage system into a sleep mode.

14. A data processor system to secure data transferred over a network, comprising:
   a remote data storage system, the remote storage system comprising:
      a storage device configured to store certain data in encrypted form, unencrypted form, or a combination thereof; and
      an electronic device coupled to the storage device, the electronic device configured to identify the certain data stored in the storage device as either encrypted or unencrypted and pass the certain data to the network encrypted, the electronic device further configured to only encrypt the certain data prior to passage of the certain data to the network responsive to identification of the certain data as unencrypted such that the certain data is not double encrypted,
   the electronic device further configured to examine the certain data to identify header information that indicates whether the certain data is either compressed or uncompressed and configured to identify the certain data as either compressed or uncompressed based on the examination of the header information; and
   a computer system communicatively coupled to the remote data storage system, the computer system comprising:
      a processor;
      a data cache coupled to the processor and configured to store the certain data from the network for use by the processor.

15. The data processor system of claim 14, wherein the computer system further comprises an input device coupled to the processor and configured to receive security credentials, wherein the computer system is further configured to erase at least a portion of the certain data from the data cache if the input device does not receive the security credentials.

16. The data processor system of claim 15, wherein the input device is configured to receive the security credential from a radio frequency identification card.

17. The data processor system of claim 15, wherein the input device includes a thumbprint scanner.

18. The data processor system of claim 14, wherein the electronic device comprises:
   a first component configured to examine the certain data read from the storage device to identify the certain data read from the storage device as stored in either encrypted form or unencrypted form; and
   a second component arranged in cooperation with the first component and configured to encrypt the certain data read from the storage device before passage of the certain data to the network if the first component identifies the certain data read from the storage device as stored in unencrypted form.

19. The data processor system of claim 18, wherein the second component is further configured to pass the certain data read from the storage device to the network without further encryption if the first component identifies the certain data read from the storage device as stored in encrypted form.

20. The data processor system of claim 18, wherein the second component is further configured to identify the certain data read from the storage device as either compressed or uncompressed, and wherein the second component is further configured to encrypt the certain data read from the storage device before the certain data is passed to the network if the second component identifies the certain data read from the storage device as compressed.

21. The data processor system of claim 18, wherein the second component is configured to use a native encryption routine to encrypt the certain data read from the storage device.

* * * * *

UNITED STATES PATENT AND TRADEMARK OFFICE
CERTIFICATE OF CORRECTION

| | | |
|---|---|---|
| PATENT NO. | : 9,178,694 B2 | Page 1 of 1 |
| APPLICATION NO. | : 14/256616 | |
| DATED | : November 3, 2015 | |
| INVENTOR(S) | : Wolfe et al. | |

It is certified that error appears in the above-identified patent and that said Letters Patent is hereby corrected as shown below:

SPECIFICATION

In Column 1, Line 7, delete "§120" and insert -- § 120 --, therefor.

In Column 10, Line 56, delete "following;" and insert -- following: --, therefor.

Signed and Sealed this
First Day of March, 2016

Michelle K. Lee
*Director of the United States Patent and Trademark Office*